(12) United States Patent
Yoshida et al.

(10) Patent No.: US 12,087,053 B2
(45) Date of Patent: *Sep. 10, 2024

(54) WORK SUPPORTING APPARATUS AND WORK SUPPORTING SYSTEM

(71) Applicant: MAXELL, LTD., Kyoto (JP)

(72) Inventors: Daisuke Yoshida, Tokyo (JP); Hiroaki Ito, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,379

(22) Filed: Apr. 19, 2023

(65) Prior Publication Data

US 2023/0252781 A1 Aug. 10, 2023

Related U.S. Application Data

(63) Continuation of application No. 17/831,491, filed on Jun. 3, 2022, now Pat. No. 11,676,379, which is a (Continued)

(30) Foreign Application Priority Data

Apr. 19, 2016 (JP) .................................. 2016-083301

(51) Int. Cl.
*H04N 9/47* (2006.01)
*G05B 15/02* (2006.01)
(Continued)

(52) U.S. Cl.
CPC .............. *G06V 20/20* (2022.01); *G05B 15/02* (2013.01); *G05B 19/418* (2013.01);
(Continued)

(58) Field of Classification Search
USPC .......................................................... 348/53
See application file for complete search history.

(56) References Cited

U.S. PATENT DOCUMENTS

| 8,374,438 B1 | 2/2013 | Wagner |
| 9,767,432 B1 | 9/2017 | Brazeau |

(Continued)

FOREIGN PATENT DOCUMENTS

| EP | 0691559 A1 | 1/1996 |
| JP | 2002-132341 A | 5/2002 |

(Continued)

OTHER PUBLICATIONS

International Search Report of PCT/JP2017/015120 dated Jul. 4, 2017.

*Primary Examiner* — Nigar Chowdhury
(74) *Attorney, Agent, or Firm* — MATTINGLY & MALUR, PC (57) ABSTRACT

A work supporting apparatus includes: a visible light camera (visible light image photographing unit) configured to photograph a visible light image; a far-infrared camera (thermal image photographing unit) configured to photograph a thermal image; a work progress status determining unit configured to determine a work progress status from the visible light image photographed by the visible light camera and the thermal image photographed by the far-infrared camera; and a display configured to display a determination result of the work progress status.

4 Claims, 9 Drawing Sheets

Related U.S. Application Data continuation of application No. 16/739,285, filed on Jan. 10, 2020, now Pat. No. 11,380,095, which is a continuation of application No. 16/094,476, filed as application No. PCT/JP2017/015120 on Apr. 13, 2017, now Pat. No. 10,565,450.

(51) Int. Cl.

| | | |
|---|---|---|
| *G05B 19/418* | (2006.01) | |
| *G05D 23/19* | (2006.01) | |
| *G06T 7/00* | (2017.01) | |
| *G06V 20/20* | (2022.01) | |
| *H04N 23/11* | (2023.01) | |
| *H04N 23/45* | (2023.01) | |
| *H04N 23/63* | (2023.01) | |
| *H04N 23/90* | (2023.01) | |
| *G01J 5/00* | (2022.01) | |

(52) U.S. Cl.
CPC ......... *G05D 23/1917* (2013.01); *G06T 7/001* (2013.01); *H04N 23/11* (2023.01); *H04N 23/45* (2023.01); *H04N 23/63* (2023.01); *H04N 23/90* (2023.01); *G01J 2005/0077* (2013.01); *G06T 2207/10024* (2013.01); *G06T 2207/10048* (2013.01)

(56) References Cited

U.S. PATENT DOCUMENTS

| | | | | |
|---|---|---|---|---|
| 2003/0203717 A1* | 10/2003 | Chuprun | ............ | H04B 7/18591 |
| | | | | 455/12.1 |
| 2008/0105749 A1* | 5/2008 | Lei | ..................... | G06K 7/10722 |
| | | | | 235/462.42 |
| 2009/0072142 A1* | 3/2009 | Blitzer | ................. | G01J 3/0264 |
| | | | | 250/216 |
| 2011/0032326 A1 | 2/2011 | Hollander | | |
| 2012/0194419 A1 | 8/2012 | Osterhout | | |
| 2013/0110264 A1 | 5/2013 | Weast | | |
| 2013/0169816 A1 | 7/2013 | Hu | | |
| 2013/0286190 A1 | 10/2013 | Xin | | |
| 2014/0104449 A1 | 4/2014 | Masarik | | |
| 2014/0168266 A1 | 6/2014 | Kimura | | |
| 2015/0324072 A1 | 11/2015 | Jung | | |
| 2015/0379491 A1 | 12/2015 | Ma | | |
| 2016/0203445 A1 | 7/2016 | Honsinger | | |
| 2016/0262608 A1 | 9/2016 | Krueger | | |
| 2016/0277681 A1 | 9/2016 | Miyamoto | | |
| 2017/0027450 A1 | 2/2017 | Toledano | | |
| 2017/0193719 A1 | 7/2017 | Haci | | |
| 2019/0282146 A1 | 9/2019 | Zand | | |
| 2021/0338864 A1* | 11/2021 | Urban | ................. | G07F 17/3216 |
| 2021/0342758 A1* | 11/2021 | Ripley | ............... | G06Q 10/0635 |
| 2021/0344371 A1* | 11/2021 | LaMarr, Jr. | ............ | A01B 69/00 |

FOREIGN PATENT DOCUMENTS

| | | |
|---|---|---|
| JP | 2006-144114 A | 6/2006 |
| JP | 2010-197153 A | 9/2010 |
| JP | 2013-130541 A | 7/2013 |
| JP | 2016-30850 A | 3/2016 |

* cited by examiner

WORK SUPPORTING APPARATUS AND WORK SUPPORTING SYSTEM

TECHNICAL FIELD

The present invention relates to a work supporting apparatus and a work supporting system.

BACKGROUND ART

In recent years, work efficiency is improved by using a portable information terminal in a maintenance work of apparatuses or facilities. According to such a portable information terminal, a worker takes in work information into the portable information terminal in advance. This makes it possible for the worker to obtain necessary information by displaying the work information on a screen during the work.

However, the worker is required to work while watching the screen with the portable information terminal in his or her hand. The work becomes complicated in such a state. The work efficiency may actually be lowered. Therefore, a work supporting apparatus capable of providing the worker with information without picking up the portable information terminal has been proposed.

For example, Patent Document 1 discloses a work supporting apparatus that uses a head-mounted type display called as a head mounted display and provides a worker with information regarding a work. By using such a head mounted display, the worker is not required to hold the portable information terminal in his or her hand, and this makes it possible to implement the work efficiently.

Further, Patent Document 1 also discloses a work supporting apparatus that includes a visible light photographing unit and an infrared photographing unit; displays a visible ray image photographed by the visible light photographing unit and an infrared ray image photographed by the infrared photographing unit on the head mounted display; detects a component around which temperature is abnormal from components detected from the visible ray image and a temperature distribution image obtained from the infrared ray image; and notifies the worker of the abnormality through the head mounted display.

RELATED ART DOCUMENTS

Patent Documents

Patent document 1: Japanese Patent Application Publication No. 2010-197153

SUMMARY OF THE INVENTION

Problems to be Solved by the Invention

In the meantime, Patent Document 1 merely discloses a method of detecting a component that becomes abnormal temperature. However, a method of notifying the worker of a progress status of the work has not been considered. For this reason, it may be difficult for the worker to grasp the progress status of the work even though the work supporting apparatus is used.

Thus, it is an object of the present invention to provide a work supporting apparatus and a work supporting system capable of notifying a worker of a progress status of a work.

Means for Solving the Problem

An outline of representative invention of the present invention disclosed in the present application will briefly be explained as follows.

A work supporting apparatus according to a representative embodiment of the present invention includes: a visible light image photographing unit configured to photograph a visible light image; a thermal image photographing unit configured to photograph a thermal image; a work progress status determining unit configured to determine a work progress status from the visible light image photographed by the visible light image photographing unit and the thermal image photographed by the thermal image photographing unit; and a display configured to display a determination result of the work progress status.

Effects of the Invention

Effects obtained by representative invention of the present invention disclosed in the present application will briefly be explained as follows.

Namely, according to the representative embodiment of the present invention, it is possible to provide a work supporting apparatus capable of notifying a worker of a progress status of a work.

DETAILED DESCRIPTION OF PREFERRED EMBODIMENTS

Hereinafter, embodiments of the present invention will be described in detail with respect to the drawings. Note that in all drawings for explaining the embodiments, the same reference numeral is assigned to members each having the same function, and repeated explanation is omitted. Further, hatching may be applied to even a plan view in order to make the drawings to be understood easily.

Moreover, in embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Further, in the embodiments described below, in a case of referring to the number of elements (including number of pieces, values, amount, range, and the like), the number of the elements is not limited to a specific number unless otherwise stated or except the case where the number is apparently limited to a specific number in principle, and the number larger or smaller than the specified number may also be applicable.

Further, in the embodiments described below, it goes without saying that the components (including element steps and the like) are not always indispensable unless otherwise stated or except the case where the components are apparently indispensable in principle.

Further, in the embodiments described below, it goes without saying that with respect to components and the like, the language "consist of A", "make up by A", "have A", or "include A" does not exclude the other components than A except for the case where it is expressly indicated to be only the component particularly. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value, the range and the like described above.

First Embodiment

Figure 1:
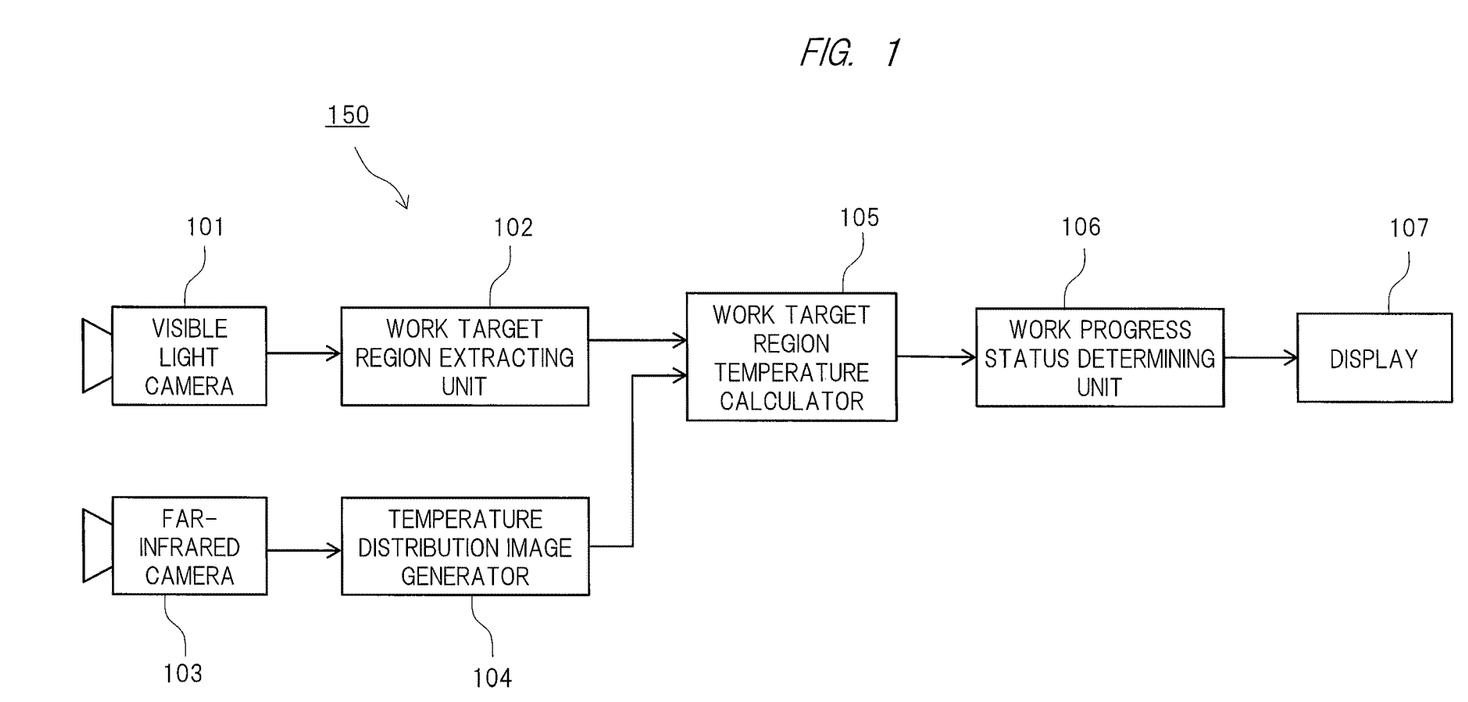
FIG. 1 is a block diagram showing one example of a configuration of a work supporting apparatus according to a first embodiment of the present invention.

FIG. 1 is a block diagram showing one example of a configuration of a work supporting apparatus according to a first embodiment of the present invention. As shown in FIG. 1, a work supporting apparatus 150 includes a visible light camera 101 as a visible light photographing unit, a far-infrared camera 103 as a thermal image photographing unit, a work target region extracting unit 102, a temperature distribution image generator 104, a work target region temperature calculator 105, a work progress status determining unit 106, and a display 107.

The visible light camera 101 is connected to the work target region extracting unit 102. The work target region extracting unit 102 is connected to the visible light camera 101 and the work target region temperature calculator 105. The far-infrared camera 103 is connected to the temperature distribution image generator 104. The temperature distribution image generator 104 is connected to the far-infrared camera 103 and the work target region temperature calculator 105. The work target region temperature calculator 105 is connected to the work target region extracting unit 102, the temperature distribution image generator 104 and the work progress status determining unit 106. The work progress status determining unit 106 is connected to the work target region temperature calculator 105 and the display 107.

The visible light camera 101 is configured to photograph a visible light image of a work target region or a peripheral region thereof, for example, and output the photographed visible light image to the work target region extracting unit 102.

The work target region extracting unit 102 is configured to extract the work target region from the visible light image.

For example, data regarding work content are stored in the work target region extracting unit 102. By comparing data for specifying the work target region with the visible light image, the work target region extracting unit 102 extracts the work target region from the visible light image. For details, the work target region extracting unit 102 carries out image processing for the visible light image, thereby specifying a shape and a size of an object in the visible light image, and referring to a shape and a size of a work target object registered in advance. Thus, the work target region extracting unit 102 extracts the work target region for which temperature measurement is carried out from the photographed visible light image.

The far-infrared camera 103 is configured to photograph a thermal image of the work target region and the peripheral region thereof, for example, and output the photographed thermal image to the temperature distribution image generator 104.

It is preferable that the visible light camera 101 and the far-infrared camera 103 are adjusted so that a photographing region of the far-infrared camera 103 substantially becomes equivalent to a photographing region of the visible light camera 101, for example.

The temperature distribution image generator 104 is configured to generate a temperature distribution image from the thermal image photographed by the far-infrared camera 103. For example, the temperature distribution image generator 104 converts the thermal image photographed by the far-infrared camera 103 into a visible light image to generate the temperature distribution image. In the temperature distribution image, different color is displayed for each temperature range. For example, in the temperature distribution image, a low temperature range is displayed by blue, a middle temperature range is displayed by yellow, and a high temperature range is displayed by red.

The work target region temperature calculator 105 is configured to calculate a work temperature of the work target region extracted by the work target region extracting unit 102 on the basis of the visible light image and the temperature distribution image generated by the temperature distribution image generator 104. For example, the work target region temperature calculator 105 compares the visible light image with the temperature distribution image with respect to the work target region extracted by the work target region extracting unit 102, which is a target of temperature measurement, whereby the work target region in the temperature distribution image is specified and temperature of the work target region is calculated.

The work progress status determining unit 106 is configured to determine a work progress status on the basis of the work temperature of the work target region, which is calculated by the work target region temperature calculator 105. For example, the work progress status determining unit 106 determines the work progress status on the basis of the work temperature of the work target region and a work time against the work target region. Specifically, the work progress status determining unit 106 starts to measure the work time when temperature of the work target region reaches a predetermined work temperature set in advance or higher, and determines the measured work progress status on the basis of the work time and a predetermined work time set in advance.

A data storage (not shown in the drawings) is provided in the work progress status determining unit 106, for example. Various kinds of data regarding the work content, the predetermined work temperature for each work target region, the predetermined work time, the image to be displayed on the display 107, and the like, and a control program and the like related to control of each unit that constitutes the work supporting apparatus 150 such as the work progress status determining unit 106 may be stored in the data storage. Further, the data storage may be provided in the other component that constitutes the work supporting apparatus 150, or may be provided independently.

Figure 2:
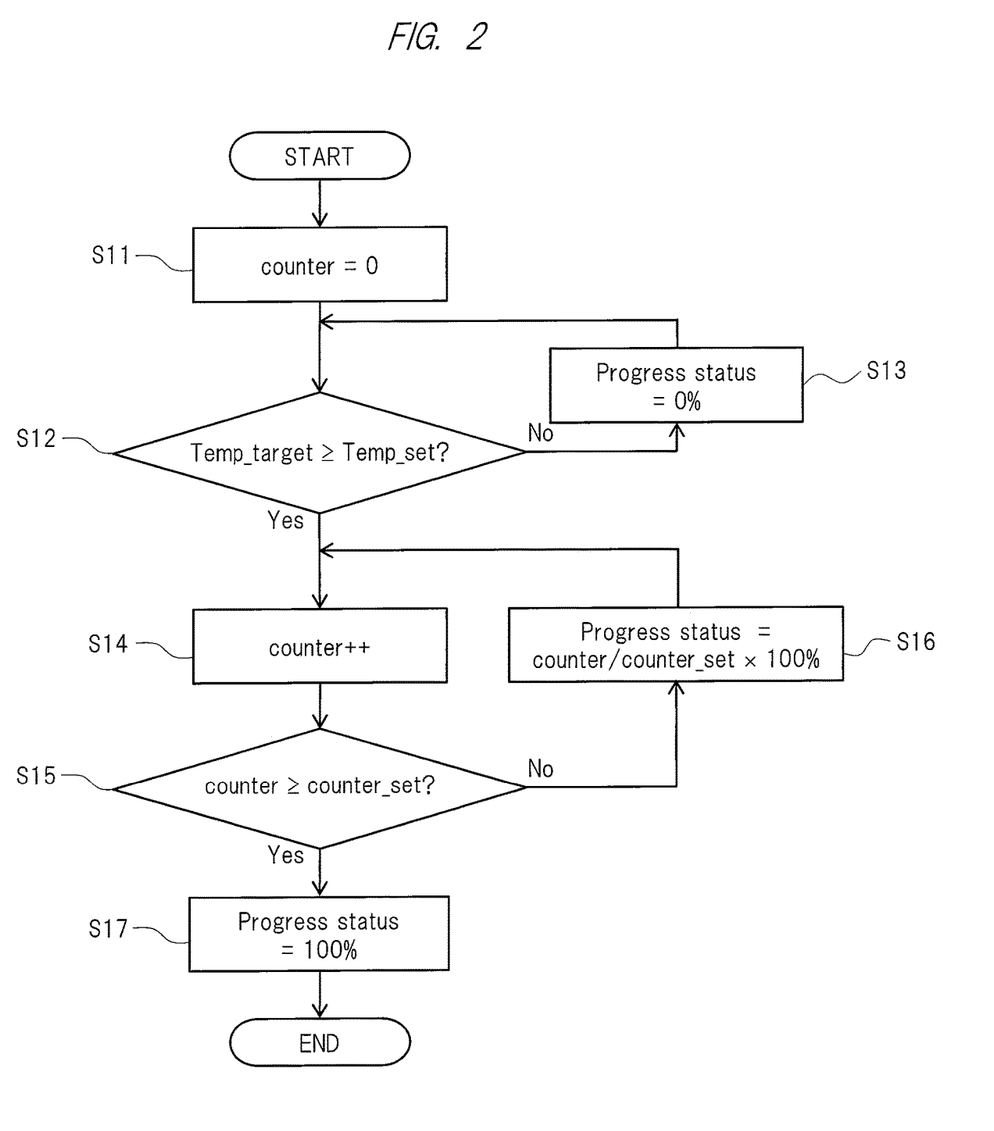
FIG. 2 is a flowchart diagram showing one example of an operation of a work progress status determining unit according to the first embodiment of the present invention.
Figure 3:
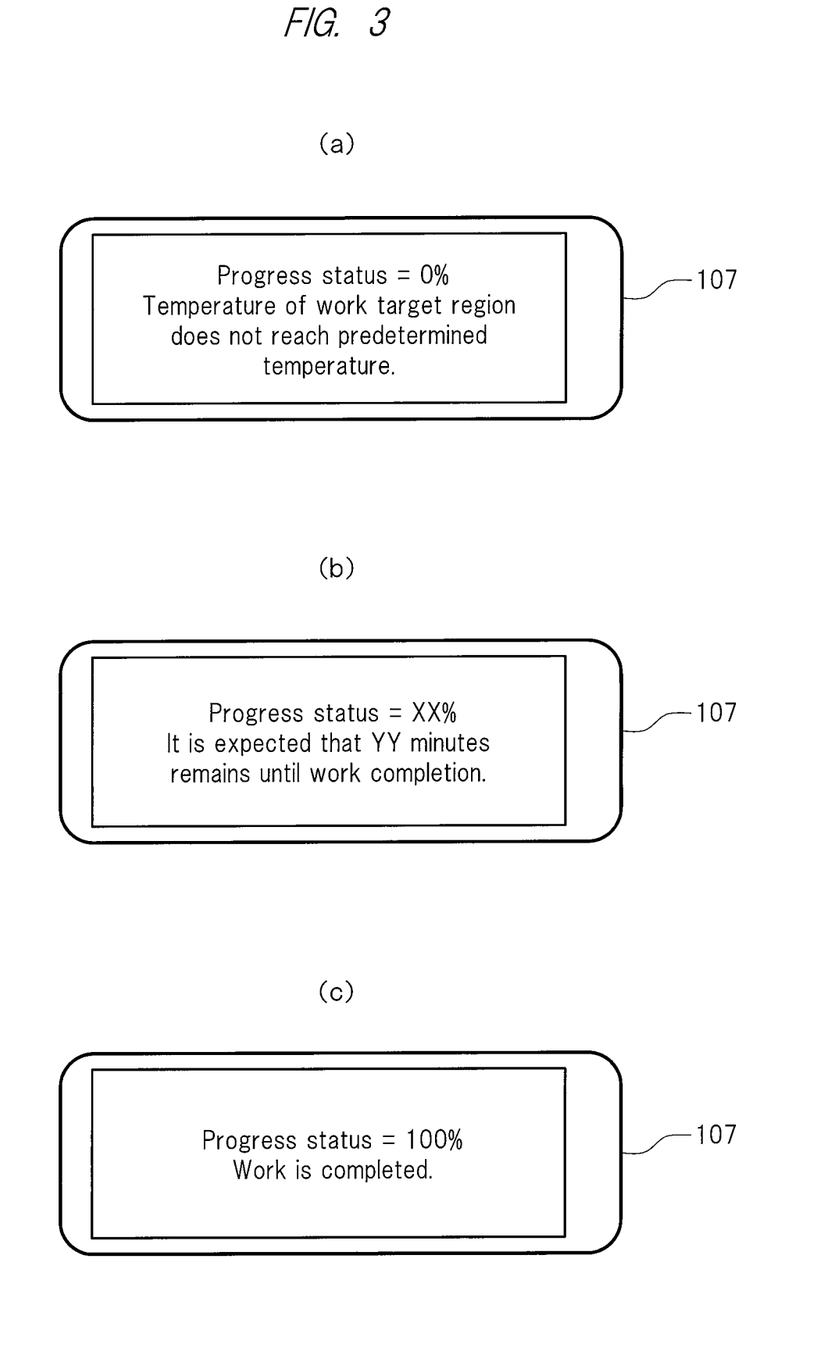
FIG. 3 is a view showing one example of an image that is displayed on a display in accordance with a work progress status.

Here, a series of operations related to determination of a work progress status carried out by the work progress status determining unit 106 will be described in detail. FIG. 2 is a flowchart diagram showing one example of an operation of the work progress status determining unit according to the first embodiment of the present invention. FIG. 3 is a view showing one example of an image that is displayed on the display in accordance with the work progress status.

Hereinafter, an operation of the work progress status determining unit will be described by exemplifying a work to heat a work target region. Further, a heating work is implemented by work equipment (not shown in the drawings), for example.

At Step S11, the work progress status determining unit 106 first sets a work time to "0" (counter=0). Such a step is provided because a work time that is measured in a work implemented before this timing is to be reset. When the work progress status determining unit 106 resets the work time, the work progress status determining unit 106 shifts to Step S12.

At Step S12, the work progress status determining unit 106 compares a work temperature (Temp_target) of a work target region calculated by the work target region temperature calculator 105 with a predetermined work temperature (Temp_set) set in advance. The work progress status determining unit 106 reads out the predetermined work temperature (Temp_set) corresponding to work content from a data storage (not shown in the drawings), for example. In a case where the work temperature of the work target region is lower than the predetermined work temperature, that is, the work temperature of the work target region does not reach the predetermined work temperature (Temp_target<Temp_set) as a result of comparison of these temperatures, the work progress status determining unit 106 determines that a work progress status thereof is 0%, and shifts to Step S13 (the determination result is "No").

At Step S13, the work progress status determining unit 106 reads out data regarding an image, which indicates to the display 107 that the progress status is 0%, from the data storage (not shown in the drawings), and outputs the data thud read out to the display 107. An image regarding a determination result as shown in FIG. 3(a) is displayed on the display 107 on the basis of the data outputted from the work progress status determining unit 106, for example. Further, otherwise, as shown in FIG. 3(a), an image that indicates a status or the like of the work target region in addition to the determination result may be displayed on the display 107, for example. When such an image is displayed on the display 107, the work progress status determining unit 106 shifts to Step S12 again. Therefore, the work progress status determining unit 106 repeatedly carries out Steps S12 to S13 until the work temperature of the work target region reaches the predetermined work temperature.

On the other hand, in a case where it is determined at Step S12 that the work temperature of the work target region is higher than the predetermined work temperature, that is, the work temperature of the work target region reaches the predetermined work temperature (Temp_target≥Temp_set), the work progress status determining unit 106 shifts to Step S14 (the determination result is "Yes").

At Step S14, the work progress status determining unit 106 starts to measure (counter++) the work time (counter). As a method of measuring the work time, for example, the work time is counted up in a predetermined cycle, and the work time is replaced with the number of counts, whereby the work time may be measured. The work time may be measured by directly measuring the time. In a case where the work time is measured by the counts, a predetermined work time (will be described later) is also expressed by the number of counts. When measurement of the work time is started, the work progress status determining unit 106 shifts to Step S15.

At Step S15, the work progress status determining unit 106 compares the work time (counter) with a predetermined work time required for the work (counter_set). The work progress status determining unit 106 reads out the predetermined work time (counter_set) corresponding to the work content from a data storage (not shown in the drawings), for example. In a case where the work time is shorter than the predetermined work time (counter<counter_set) as a result of comparison of these times, the work progress status determining unit 106 shifts to Step S16 (the determination result is "No").

At Step S16, the work progress status determining unit 106 determines a work progress status on the basis of the work time (counter) and the predetermined work time (counter_set). Specifically, the work progress status determining unit 106 concretely calculates a numerical value indicating the work progress status by using the following formula "work progress status=counter/(counter_set)×100(%)". Further, when the work progress status is calculated, the work progress status determining unit 106 reads out data regarding an image indicating "during the work" from a data storage (not shown in the drawings), and outputs the data thus readout to the display 107. An image regarding a determination result as shown in FIG. 3(b), that is, a concrete numerical value of the work progress status is displayed on the display 107 on the basis of the data outputted from the work progress status determining unit 106, for example. Further, otherwise, as shown in FIG. 3(b), an image indicating information on a remaining time to work completion and the like in addition to the determination result may be displayed on the display 107, for example. When such an image is displayed on the display 107, the work progress status determining unit 106 shifts to Step S14 again, and carries out the process related to Steps S14, S15. Namely, since the work progress status is less than 100% herein, the work progress status determining unit 106 returns to Step S14 again. Therefore, the work progress status determining unit 106 repeatedly carries out these Steps S14 to S16 until the work time reaches the predetermined work time and the work progress status thereby becomes 100%.

On the other hand, in a case where it is determined at Step S15 that the work time is equal to or longer than the predetermined work time (counter≥counter_set) as a result of comparison of these times, the work progress status determining unit 106 determines that the work for the work target region is completed, and shifts to Step S17 (the determination result is "Yes").

At Step S17, the work progress status determining unit 106 reads out data regarding an image indicating that the work is completed from a data storage (not shown in the drawings), and outputs the data thus read out to the display 107. An image regarding a determination result as shown in FIG. 3(c), that is, an image indicating that the work progress status is 100% is displayed on the display 107 on the basis of the data outputted from the work progress status determining unit 106, for example. Further, otherwise, as shown in FIG. 3(c), an image indicating that the work is completed may be displayed on the display 107 in addition to the determination result, for example. When the image indicating that the work for the work target region is completed is displayed on the display 107, the work progress status determining unit 106 terminates the series of operations related to the determination of the work progress status.

As described above, the display 107 receives an input of data on the image regarding the determination result of the work progress status outputted from the work progress status determining unit 106 and the like, and displays thereon various kinds of images on the basis of the inputted data. Any of various kinds of display panels such as a liquid crystal panel, an organic EL (electroluminescence) panel, or a so-called electronic paper is used as the display 107, for example.

Each of the work target region extracting unit 102, the temperature distribution image generator 104, the work target region temperature calculator 105, and the work progress status determining unit 106 may be realized by different hardware or software. Further, these components may be realized all in one piece of hardware, or may be realized all in one piece of software. Alternatively, these components may be realized in the other component.

Figure 4:
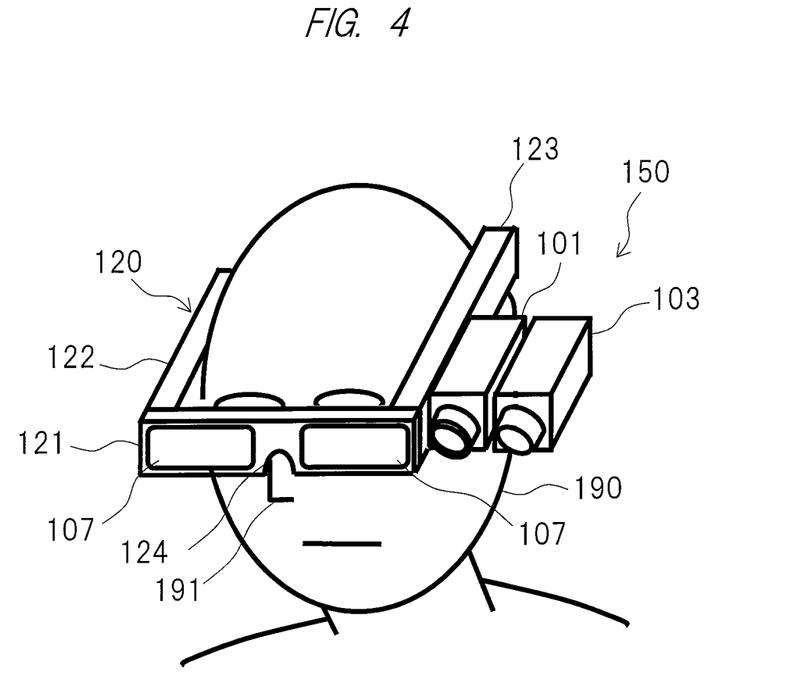
FIG. 4 is a view showing one example of a form of the work supporting apparatus according to the first embodiment of the present invention.
Figure 5:
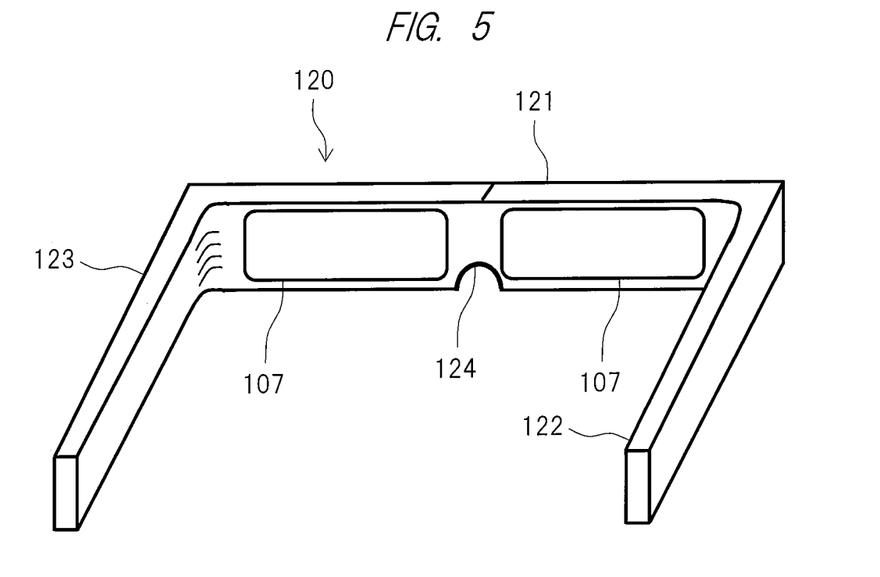
FIG. 5 is a view showing one example of a configuration of a head mounted display according to the first embodiment of the present invention.

Here, one example of a configuration of the work supporting apparatus 150 will be described. FIG. 4 is a view showing one example of a form of the work supporting apparatus according to the first embodiment of the present invention. FIG. 5 is a view showing one example of a configuration of a head mounted display according to the first embodiment of the present invention.

The display 107 of the work supporting apparatus 150 is provided in a head mounted display 120, for example, as shown in FIG. 4 and FIG. 5. As shown in FIG. 4, the visible light camera 101, the far-infrared camera 103, and the like are attached to the head mounted display 120, for example. As shown in FIG. 4, the visible light camera 101 and the far-infrared camera 103 may be attached in the vicinity of the display 107, for example, or may be attached to a helmet for work that is to be worn by a worker 190 or the like. Note that in FIG. 4, the work target region extracting unit 102, the temperature distribution image generator 104, the work target region temperature calculator 105, the work progress status determining unit 106 and the like are not displayed. However, a control unit including these components may be provided by a separate body, for example, and the control unit may be connected to each of the visible light camera 101, the far-infrared camera 103, the display 107, and the like.

The head mounted display 120 is a spectacle type display apparatus that the worker 190 wears on his or her head. As shown in FIG. 4 and FIG. 5, the head mounted display 120 includes a frame 121, temples 122, 123, a pad 124, the display 107, and the like.

The frame 121 is a member for supporting the display 107. The temple 122 is connected to a right end portion of the frame 121 when viewed from the worker 190 who wears the work supporting apparatus 150, and is extended toward the rear of the worker 190. The temple 123 is connected to a left end portion of the frame 121 when viewed from the worker 190 who wears the work supporting apparatus 150, and is extended toward the rear of the worker 190.

When the head mounted display 120 is worn by the worker 190, as shown in FIG. 4, the pad 124 is mounted on a nose 191 of the worker 190, and each of the temples 122, 123 abuts on a corresponding temporal region and ear (not shown in the drawings) of the worker 190, whereby the head mounted display 120 is supported on the head of the worker 190. Then, the display 107 is arranged in front of eyes of the worker 190. The worker 190 is allowed to view an image displayed on the display 107 without using his or her one hand or both hands, whereby it is possible for the worker 190 to obtain information necessary for the work.

FIG. 4 and FIG. 5 show the case where the two displays 107 are implemented in the head mounted display 120. However, the present invention is not limited to such a configuration. For example, the display 107 may be provided at only one of right and left lenses.

The display 107 may be configured so as to be attached to spectacle lenses used by the worker 190, for example, or may be configured to be stuck to goggles for work or the spectacle lenses, for example.

According to the present embodiment, the work progress status determining unit 106 determines the work progress status on the basis of the visible light image photographed by the visible light camera 101 and the thermal image photographed by the far-infrared camera 103, and the determination result is displayed on the display 107.

According to this configuration, the worker 190 can watch or view the determination result of the work progress status displayed on the display 107. Therefore, it is possible to notify the worker of a progress status of the work.

Further, according to the present embodiment, the work target region temperature calculator 105 calculates the work temperature of the work target region from the work target region extracted by the work target region extracting unit 102 and the temperature distribution image generated by the temperature distribution image generator 104; the work progress status determining unit 106 determines the work progress status on the basis of the calculated work temperature and the work time against the work target region; and the determination result of the work progress status is displayed on the display 107.

According to this configuration, the work progress status is determined on the basis of the work temperature and the work time. Therefore, it is possible to improve accuracy of the work.

Further, according to the present embodiment, in a case where the work to heat the work target region is carried out, the work progress status determining unit 106 starts to measure the work time when temperature of the work target region reaches the predetermined work temperature set in advance or higher, and determines the work progress status on the basis of the measured work time and the predetermined work time set in advance until the work is completed.

According to this configuration, in a case where the temperature of the work target region is lower than the predetermined work temperature, the work time for the work is not counted. Therefore, it is possible to further improve accuracy of the work.

Further, according to the present embodiment, as shown in FIG. 3(a) to FIG. 3(c), the image of the status or the like of the work target region, the image of the remaining time to the work completion or the like, the image indicating that the work is completed, and the like are displayed on the display 107 in addition to the determination result of the work progress status. According to this configuration, the worker 190 is allowed to obtain additional information regarding the work target region. Therefore, it is possible to grasp the work progress status in more detail.

Further, according to the present embodiment, the work target region extracting unit 102 extracts the work target region from the visible light image photographed by the visible light camera 101; the temperature distribution image generator 104 generates the temperature distribution image from the thermal image photographed by the far-infrared camera 103; and the work target region temperature calculator 105 calculates the work temperature of the work target region on the basis of the work target region and the temperature distribution image. According to this configuration, since the temperature of the work target region is accurately calculated, it is possible to improve accuracy of the work.

Further, according to the present embodiment, the visible light camera 101 and the far-infrared camera 103 are adjusted so that the photographing region of the far-infrared camera 103 substantially becomes equivalent to the photographing region of the visible light camera 101. According to this configuration, comparison of the visible light image and the temperature distribution image becomes easy, and this makes it possible to calculate the work temperature of the work target region more accurately. Further, this makes it possible to improve accuracy of the work.

Further, according to the present embodiment, the display 107 is provided in the head mounted display 120. According to this configuration, the worker 190 wears the head mounted display 120 on the head, whereby the display 107 is arranged in front of the eyes of the worker 190. Therefore, it is possible for the worker 190 to obtain the determination result of the work progress status without using the both hands.

Second Embodiment

Next, a second embodiment according to the present invention will be described. In a work supporting apparatus according to the present embodiment, in a case where a plurality of works is implemented, a work progress status determining unit 106 determines a work progress status of a next work after one work is completed. For example, when a work progress status of the one work reaches 100%, work content at a next step is displayed on a display 107, the work progress status determining unit 106 starts to determine the work progress status of the next work.

Figure 6:
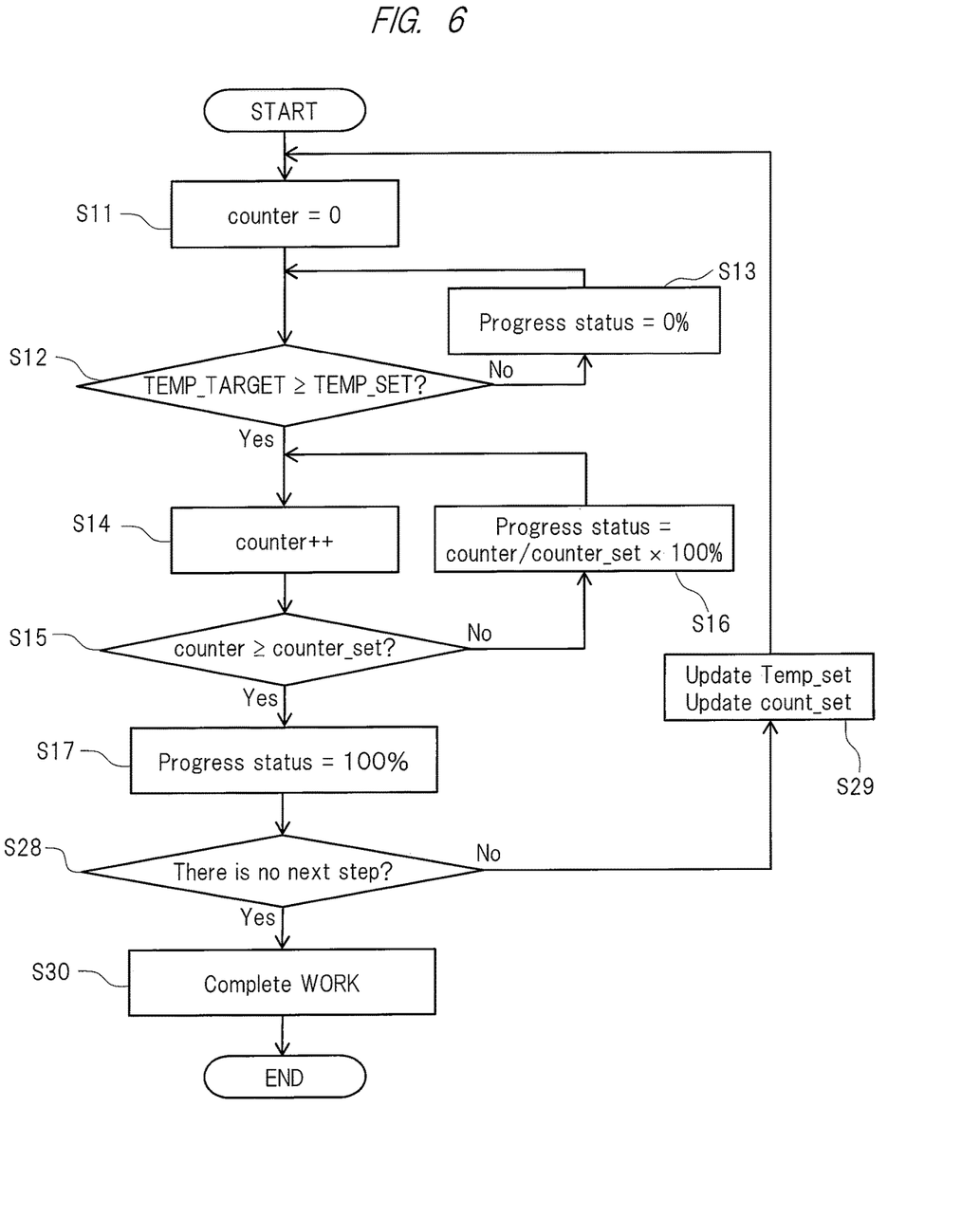
FIG. 6 is a flowchart diagram showing one example of an operation of a work progress status determining unit according to a second embodiment of the present invention.
Figure 7:
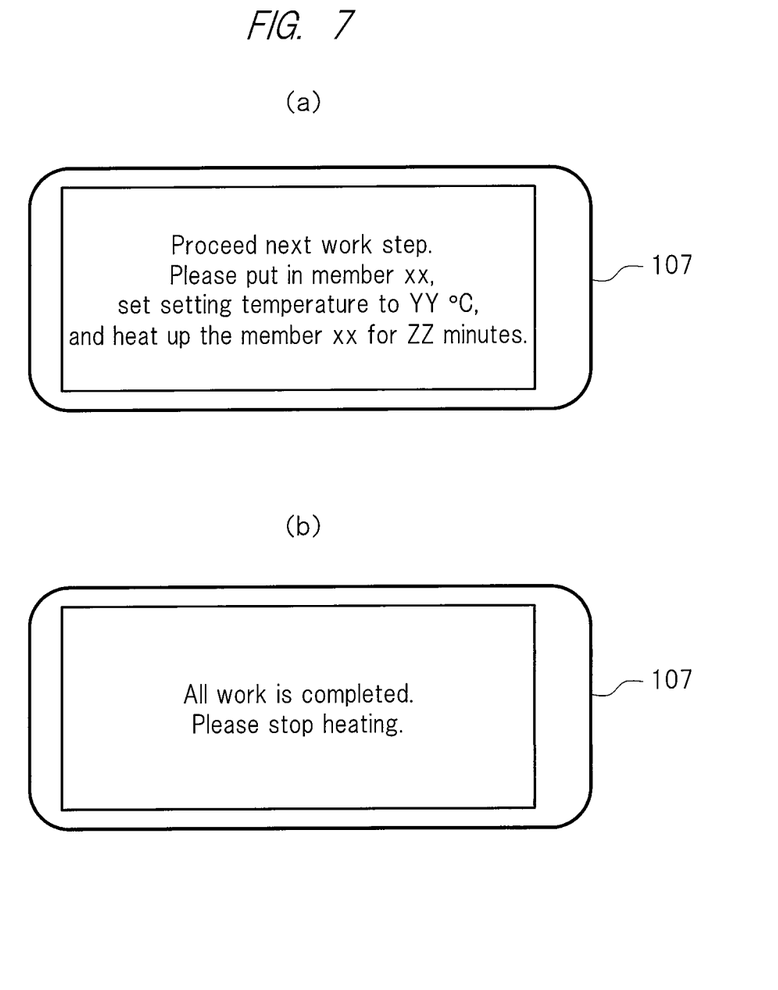
FIG. 7 is a view showing one example of an image that is displayed on a display in accordance with a work progress status.

FIG. 6 is a flowchart diagram showing one example of an operation of a work progress status determining unit according to the second embodiment of the present invention. FIG. 7 is a view showing one example of an image that is displayed on a display in accordance with the work progress status.

Operations of the work progress status determining unit 106 at Steps S11 to S17 among these are the same as those in the first embodiment. Therefore, detailed explanation thereof is omitted.

At Step S17, as shown in FIG. 3(c), when an image indicating that a work for a work target region is completed, for example, an image indicating that a work progress status thereof reaches 100% is displayed on the display 107, the work progress status determining unit 106 shifts to Step S28 shown in FIG. 6. At Step S28, the work progress status determining unit 106 determines whether there is a next work or not. For example, the work progress status determining unit 106 reads out data regarding work content from a data storage (not shown in the drawings), and determines whether there is a next work or not by being compared with the completed work content. In a case where it is determined that there is a next work, the work progress status determining unit 106 shifts to Step S29 (the determination result is "No").

At Step S29, the work progress status determining unit 106 reads out data regarding an image indicating that it shifts to the next work from a data storage (not shown in the drawings), for example, and outputs the data thus read out to the display 107. As shown in FIG. 7(a), the image indicating that it shifts to the next work is displayed on the display 107 on the basis of the data outputted from the work progress status determining unit 106, for example. Further, otherwise, as shown in FIG. 7(a), an image indicating concrete content of a next work, and the like may be displayed on the display 107 in addition to the image indicating that it shifts to the next work, for example. Further, the work progress status determining unit 106 reads out a predetermined work temperature (Temp_set) and a predetermined work time (counter_set) corresponding to the next work content from a data storage (not shown in the drawings), for example, and updates data regarding the predetermined work temperature and the predetermined work time. When these operations are carried out, the work progress status determining unit 106 shifts to Step S11, and carries out determination of the work progress status regarding the next work content.

On the other hand, in a case where it is determined at Step S28 that there is no next work, the work progress status determining unit 106 shifts to Step S30 (the determination result is "Yes"). At Step S30, the work progress status determining unit 106 reads out data regarding an image indicating that all of the works are completed from a data storage (not shown in the drawings), for example, and outputs the data thus read out to the display 107. As shown in FIG. 7(b), the image indicating that all of the works are completed is displayed on the display 107 on the basis of the data outputted from the work progress status determining unit 106, for example. Further, otherwise, as shown in FIG. 7(b), concrete instruction content to the worker 190 after the works are terminated may be displayed on the display 107, for example. When the image indicating that all of the works are completed is displayed on the display 107, the work progress status determining unit 106 terminates the series of operations related to the determination of the work progress status.

According to the present embodiment, the work progress status determining unit 106 automatically implements determination of a work progress status of a next work after one work is completed, and the work progress status of the next work is displayed on the display 107. According to this configuration, even in a case where a plurality of works is continuously implemented, the determination result regarding the progress status of the work is displayed automatically. Therefore, it is possible to omit an operation to implement determination of a work progress status for each work, and this makes it possible to improve work efficiency drastically.

Third Embodiment

Next, a third embodiment of the present invention will be described. In the present embodiment, a work supporting system that consists of a work supporting apparatus and work equipment by which a worker carries out a work such as heating will be described.

Figure 8:
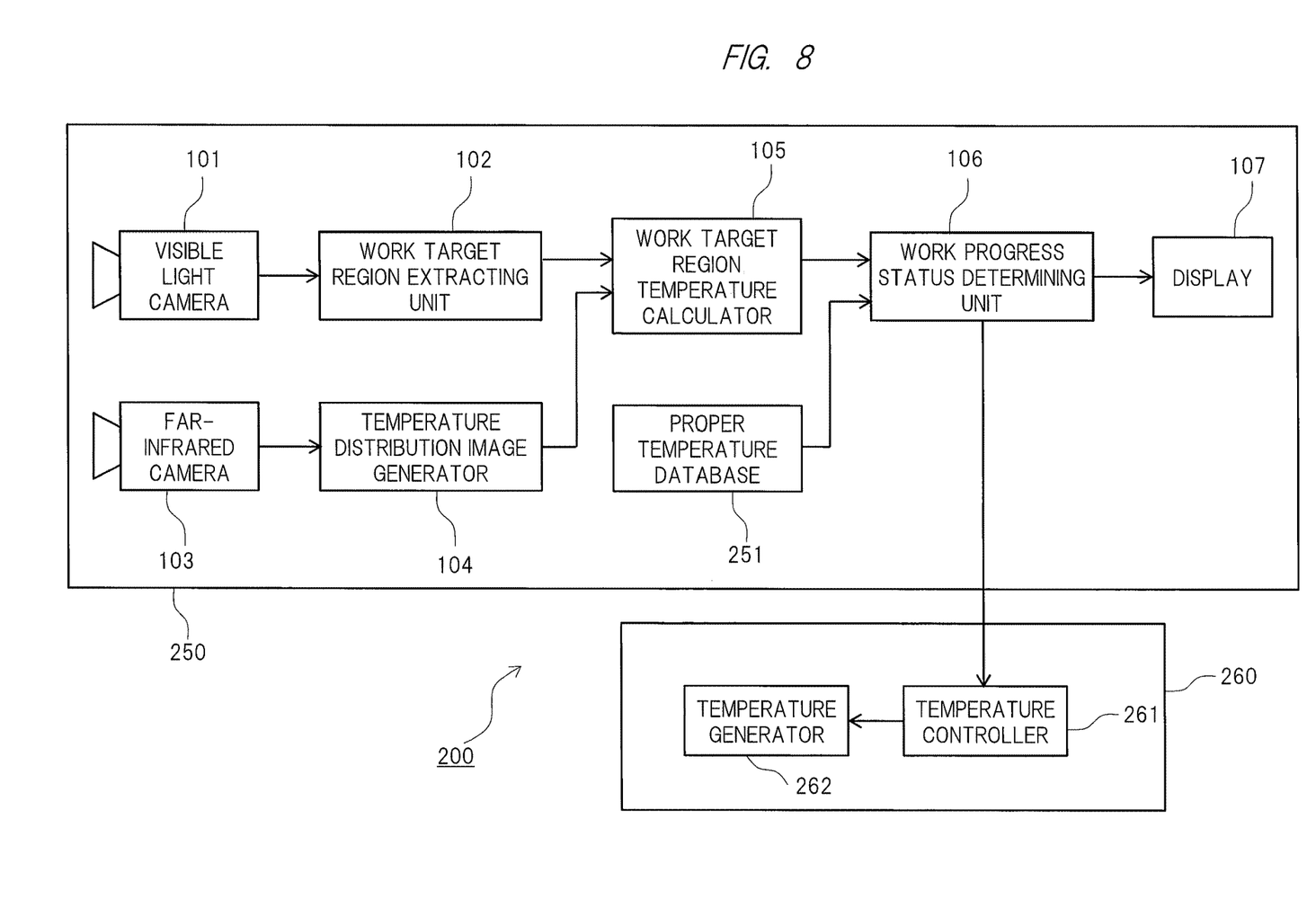
FIG. 8 is a block diagram showing one example of a configuration of a work supporting system according to a third embodiment of the present invention.

FIG. 8 is a block diagram showing one example of a configuration of the work supporting system according to the third embodiment of the present invention. As shown in FIG. 8, a work supporting system 200 includes a work supporting apparatus 250 and work equipment 260. The work supporting apparatus 250 includes a visible light camera 101 as a visible light photographing unit, a far-infrared camera 103 as a thermal image photographing unit, a work target region extracting unit 102, a temperature distribution image generator 104, a work target region temperature calculator 105, a work progress status determining unit 106, a display 107, and a proper temperature database 251. The work equipment 260 includes a temperature controller 261 and a temperature generator 262.

The proper temperature database 251 of the work supporting apparatus 250 is connected to the work progress status determining unit 106. The work progress status determining unit 106 is connected to the proper temperature database 251 and the temperature controller 261 of the work equipment 260. The work progress status determining unit 106 and the temperature controller 261 are connected to each other by electrical wiring such as a cable, for example. Herewith, the work supporting apparatus 250 is connected to the work equipment 260. The temperature controller 261 is connected to the work progress status determining unit 106 and the temperature generator 262. Among these components, the visible light camera 101, the far-infrared camera 103 as the thermal image photographing unit, the work target region extracting unit 102, the temperature distribution image generator 104, the work target region temperature calculator 105, and the display 107 have been explained in the first embodiment. Therefore, detailed explanation thereof is omitted.

The proper temperature database 251 is configured to retain information regarding a proper temperature of a work target region at the time of a work therein. The proper temperature database 251 may retain information regarding a proper temperature of each of a plurality of works therein, for example, or may retain information regarding a proper temperature updated for each work therein.

The work progress status determining unit 106 determines a work progress status as described above. Further, the work progress status determining unit 106 is configured to calculate a difference between the work temperature of the work target region and the proper temperature read out from the proper temperature database 251, and output the difference to the temperature controller 261 of the work equipment 260 as difference temperature information.

The temperature controller 261 is configured to carry out temperature control on the basis of the difference temperature information outputted from the work progress status determining unit 106. For example, in a case where it is determined that the work temperature of the work target region is lower than the proper temperature on the basis of the difference temperature information, the temperature controller 261 implements control to raise the work temperature. For details, the temperature controller 261 implements control to cause the temperature generator 262 to raise a temperature of the temperature generator 262. Specifically, the temperature controller 261 increases an amount of current to be supplied to a temperature adjusting member such as a heater (not shown in the drawings) or the like, which constitutes the temperature generator 262, for example. This causes the work temperature of the work target region to be raised. At that time, the work progress status determining unit 106 may cause the display 107 to display an image indicating that temperature of the work equipment 260 is raised.

On the other hand, in a case where it is determined that the work temperature of the work target region is higher than the proper temperature on the basis of the difference temperature information, the temperature controller 261 implements control to suppress the work temperature from being raised. For details, the temperature controller 261 implements control to cause the temperature generator 262 to suppress the temperature of the temperature generator 262 from being raised. Specifically, the temperature controller 261 reduces the amount of current to be supplied to the heater or the like, for example. This causes rise in the work temperature to be suppressed. At that time, the work progress status determining unit 106 may cause the display 107 to display an image indicating that the rise in the temperature of the work equipment 260 is suppressed thereon.

Further, in a case where it is determined that the work temperature of the work target region is too high compared with the proper temperature on the basis of the difference temperature information, the temperature controller 261 may implement control to reduce the work temperature. For details, the temperature controller 261 implements control to cause the temperature generator 262 to reduce the temperature of the temperature generator 262. Specifically, the temperature controller 261 further reduces the amount of current to be supplied to the heater or the like, for example. Alternatively, the temperature controller 261 temporarily stops current supply to the heater or the like. This causes the work temperature to be reduced. At that time, the work progress status determining unit 106 may cause the display 107 to display an image indicating that the temperature of the work equipment 260 is reduced thereon.

The temperature controller 261 may be realized by hardware, or may be realized by software. Further, the temperature controller 261 may be realized in hardware or software for any of the other components.

According to the present embodiment, for example, the temperature controller 261 controls the amount of current to be supplied to the temperature generator 262 on the basis of the difference temperature information calculated by the work progress status determining unit 106, thereby controlling the temperature of the temperature generator 262. According to this configuration, the work temperature of the work target region can be controlled while causing the work supporting apparatus 250 and the work equipment 260 to cooperate with each other. Therefore, it is possible to carry out the work more efficiently. Further, according to this configuration, the work against the work target region is implemented in the vicinity of the proper temperature. Therefore, it is possible to improve accuracy of the work.

Further, according to the present embodiment, an image regarding temperature control information against the work equipment 260 is displayed on the display 107. According to this configuration, the worker 190 is also allowed to know a status of the work equipment 260 in addition to the work progress status. Therefore, it is possible to obtain more detailed information regarding the work.

Fourth Embodiment

Next, a fourth embodiment of the present invention will be described. In the present embodiment, a work supporting system in which a work supporting apparatus is wirelessly connected to work equipment will be described.

Figure 9:
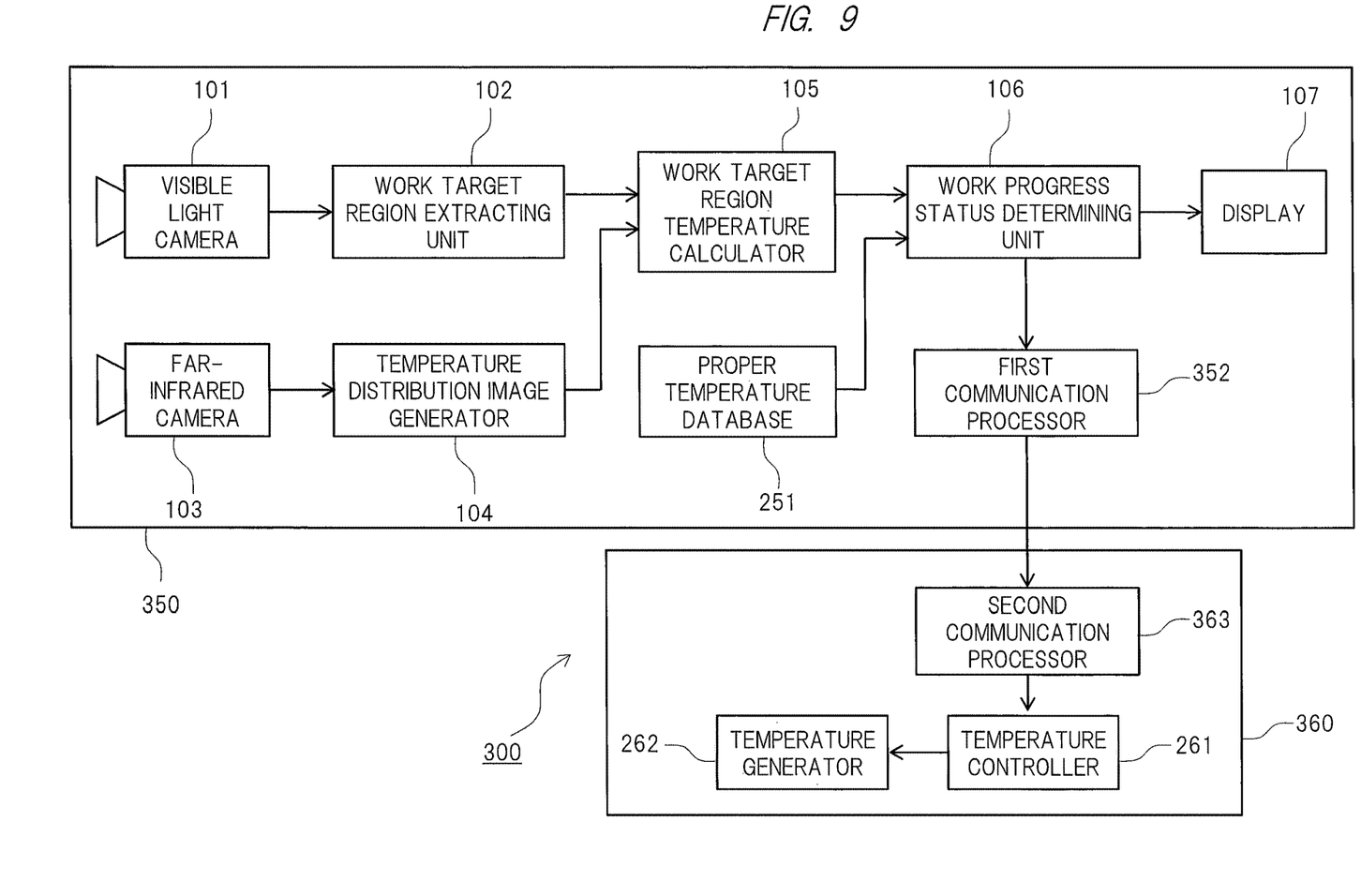
FIG. 9 is a block diagram showing one example of a configuration of a work supporting system according to a fourth embodiment of the present invention.

FIG. 9 is a block diagram showing one example of a configuration of a work supporting system according to the fourth embodiment of the present invention. As shown in FIG. 9, a work supporting system 200 includes a work supporting apparatus 350 and work equipment 360. The work supporting apparatus 350 includes the components of the work supporting apparatus 250 shown in FIG. 8 and a first communication processor 352. The work equipment 360 includes the components of the work equipment 260 shown in FIG. 8 and a second communication processor 363.

In the present embodiment, a work progress status determining unit 106 is configured to output difference temperature information to the first communication processor 352.

The first communication processor 352 is connected to the work progress status determining unit 106. Further, the first communication processor 352 is an external interface for connecting the work supporting apparatus 350 to the work equipment 360, and is connected to the second communication processor 363 of the work equipment 360 through a wireless network. The first communication processor 352 and the second communication processor 363 are allowed to mutually transmit and receive data through the wireless network. For example, the first communication processor 352 transmits, to the second communication processor 363, the difference temperature information outputted from the work progress status determining unit 106.

The second communication processor 363 is connected to the temperature controller 261. Further, the second communication processor 363 is an external interface for connecting the work supporting apparatus 350 to the work equipment 360, and is connected to the first communication processor 352 of the work supporting apparatus 350 through the wireless network. The second communication processor 363 outputs the difference temperature information received from the first communication processor 352 to the temperature controller 261.

The temperature controller 261 executes temperature control as described above on the basis of the difference temperature information outputted from the second communication processor 363, for example.

According to the present embodiment, the first communication processor 352 is connected to the second communication processor 363 through the wireless network, and transmission and reception of various kinds of data such as the difference temperature information are implemented between the first communication processor 352 and the second communication processor 363. According to this configuration, even though the work supporting apparatus 350 is not connected to the work equipment 360 by wiring, it is possible to implement temperature control for the work equipment 360 on the basis of the difference temperature information. Therefore, handling of the work supporting apparatus 350 and the work equipment 360 becomes easy, and this makes it possible to implement the work easily.

Other Embodiments

A work to heat a work target region has been described in the embodiments described above as an example. However, the present invention is not limited to such a case. For example, the present invention can be applied to a work to cool a work target region. In this case, at Step S12 shown in FIG. 2 and FIG. 6, in a case where the work temperature of the work target region exceeds the predetermined work temperature, that is, in a case where the work temperature of the work target region does not reach the predetermined work temperature (Temp_target>Temp_set), the work progress status determining unit 106 determines that the work progress status is 0%, and shifts to Step S13 (the determination result is "No"). On the other hand, in a case where the work temperature of the work target region is equal to or lower than the predetermined work temperature, that is, in a case where the work temperature of the work target region reaches the predetermined work temperature (Temp_target<Temp_set), the work progress status determining unit 106 shifts to Step S14 (the determination result is "Yes").

Further, in FIG. 2 and FIG. 6, when the work temperature of the work target region reaches the predetermined work temperature and measurement of the work time is started, a step of determining a work temperature is not provided. However, the step of determining the work temperature may be provided during measurement of the work time, for example. In this case, for example, in a case where the work temperature is reduced, the work progress status determining unit 106 may temporarily stop measurement of the work time, and then measure a remaining work time after the work temperature is recovered. According to such a configuration, it is possible to improve work accuracy further.

As described above, the invention made by the present inventors has been concretely described on the basis of the embodiments of the invention. However, it goes without saying that the present invention is not limited to the embodiments of the invention, and can modified into various forms of applications without departing from the substance of the invention.

In this regard, the present invention is not limited to the embodiments described above, and various modifications are contained. For example, the embodiments described above have been explained in detail for explaining the present invention clearly. The present invention is not necessarily limited to one that includes all configurations that have been explained.

Further, a part of the configuration of one embodiment can be replaced by a configuration of the other embodiment. Further, a configuration of the other embodiment can be added to a configuration of one embodiment. Moreover, a part of the configuration of each of the embodiments can be added to the other configuration, deleted or replaced thereby. Note that each member illustrated in the drawings and a relative size thereof are simplified and idealized in order to clearly explain the present invention, and each member may have a more complex shape on implementation thereof.

REFERENCE SINGS LIST

101 . . . visible light camera, 102 . . . work target region extracting unit, 103 . . . far-infrared camera, 104 . . . temperature distribution image generator, 105 . . . work target region temperature calculator, 106 . . . work progress status determining unit, 107 . . . display, 120 . . . head mounted display, 150 . . . work supporting apparatus, 200 . . . work supporting system, 250 . . . work supporting apparatus, 251 . . . proper temperature database, 260 . . . work equipment, 261 . . . temperature controller, 262 . . . temperature generator, 300 . . . work supporting system, 350 . . . work supporting apparatus, 352 . . . first communication processor, 360 . . . work equipment, 363 . . . second communication processor

The invention claimed is:

1. A method, performed by head-mounted work supporting apparatus, comprising the steps of:
 photographing a visible light image;
 photographing a thermal image;
 storing work information, the work information containing work time information and work temperature information of each work;
 determining a work progress status from the visible light image and the thermal image;
 displaying a determination result of the work progress status;

extracting a work target region from the visible light image;

generating a temperature distribution image from the thermal image;

calculating a target temperature of the work target region on a basis of the visible light image and the temperature distribution image;

determining the work progress status on a basis of the target temperature of the work target region and the work information on the work target region; and in a case where it is determined that a work is terminated from the determination result of the work progress status, causing the display to display a termination notification of the work.

2. The method according to claim 1, wherein plural kinds of work information are stored as the work information, and the method further comprising the steps of:

in a case where it is determined that a first work is terminated from the determination result of the work progress status, causing the display to display information on a second work, and starting to determine a work progress status of the second work.

3. The method according to claim 1, further comprising the steps of:

calculating a control temperature of the work equipment on a basis of the visible light image and the thermal image, the work equipment being a heat source in the work target region;

executing transmission or reception of information to or from the work equipment; and in a case where there is a difference between the calculated control temperature and the work temperature information of the stored work information, outputting control information for controlling the work temperature of the work equipment to the work equipment.

4. The method according to claim 3, wherein plural kinds of work information are stored as the work information, and the method further comprising the steps of:

in a case where it is determined that a first work is terminated from the determination result of the work progress status, outputting control information for controlling the work temperature of the work equipment to the work equipment, and calculating the work temperature of the work equipment from information on a second work.

\* \* \* \* \*